(12) United States Patent
Kim et al.

(10) Patent No.: US 7,528,917 B2
(45) Date of Patent: May 5, 2009

(54) LIQUID CRYSTAL DISPLAY DEVICE HAVING STRUCTURE OF COLOR FILTER ON TFT AND USING IN PLANE SWITCHING MODE

(75) Inventors: Dong-Guk Kim, Gyeonggi-Do (KR); Seung-Ryull Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 519 days.

(21) Appl. No.: 11/137,448

(22) Filed: May 26, 2005

(65) Prior Publication Data

US 2005/0270446 A1 Dec. 8, 2005

(30) Foreign Application Priority Data

May 31, 2004 (KR) .................. 10-2004-0039344

(51) Int. Cl.
*G02F 1/1335* (2006.01)
*G02F 1/1333* (2006.01)
*G02F 1/1343* (2006.01)

(52) U.S. Cl. .................. 349/141; 349/106; 349/110

(58) Field of Classification Search .................. 349/103, 349/110, 141
See application file for complete search history.

(56) References Cited

U.S. PATENT DOCUMENTS

| 6,894,756 B2* | 5/2005 | Moon et al. .................. 349/141 |
| 7,199,514 B2* | 4/2007 | Yoneda ....................... 313/501 |
| 7,205,967 B2* | 4/2007 | Morishige et al. ............. 345/77 |
| 2004/0007704 A1* | 1/2004 | Kim ............................ 257/59 |

* cited by examiner

*Primary Examiner*—Julie Ngo
(74) *Attorney, Agent, or Firm*—McKenna Long & Aldridge LLP

(57) ABSTRACT

A liquid crystal display device includes gate lines crossing data lines on a first substrate defining a pixel region; at least one common electrode formed in the pixel region; at least one pixel electrode in the pixel region, the at least one pixel electrode corresponding to the common electrode; a color filter layer formed within the pixel region excluding the gate line and the data line; a black matrix having at least three layers, an inner layer of the at least three layers being an electrode material.

11 Claims, 7 Drawing Sheets

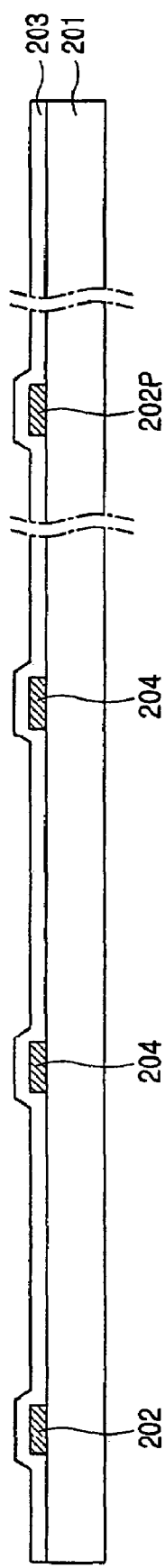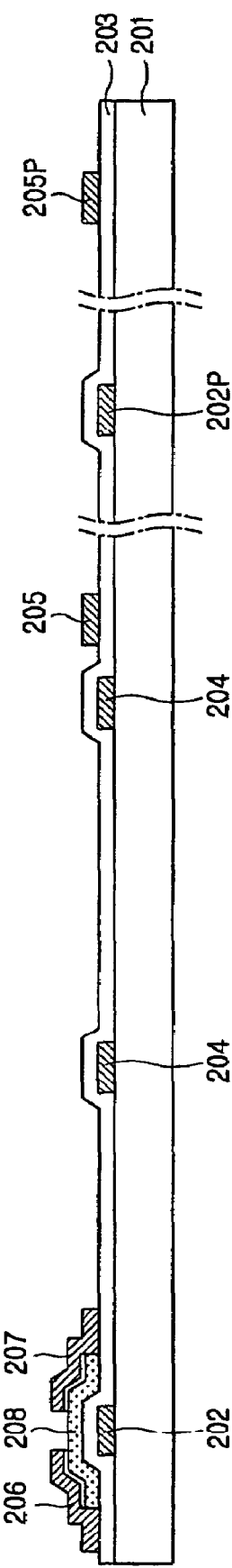

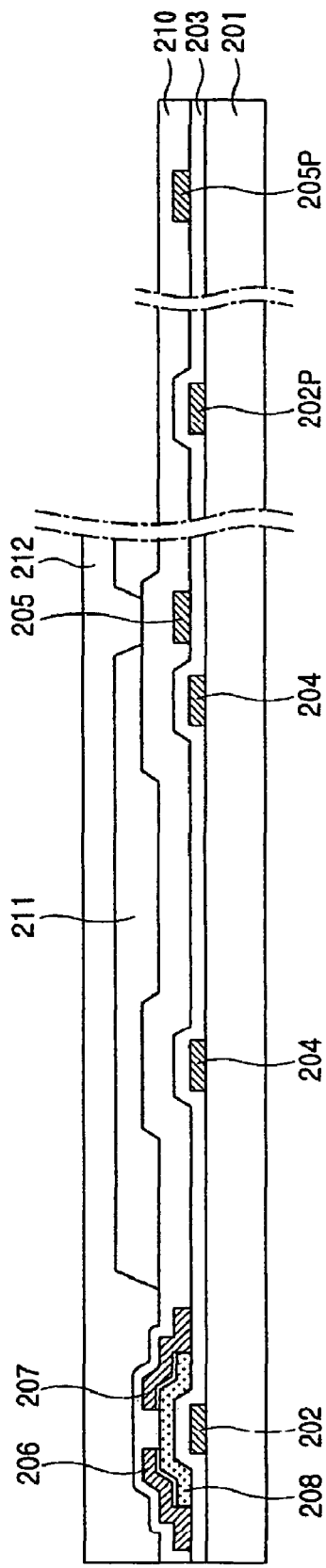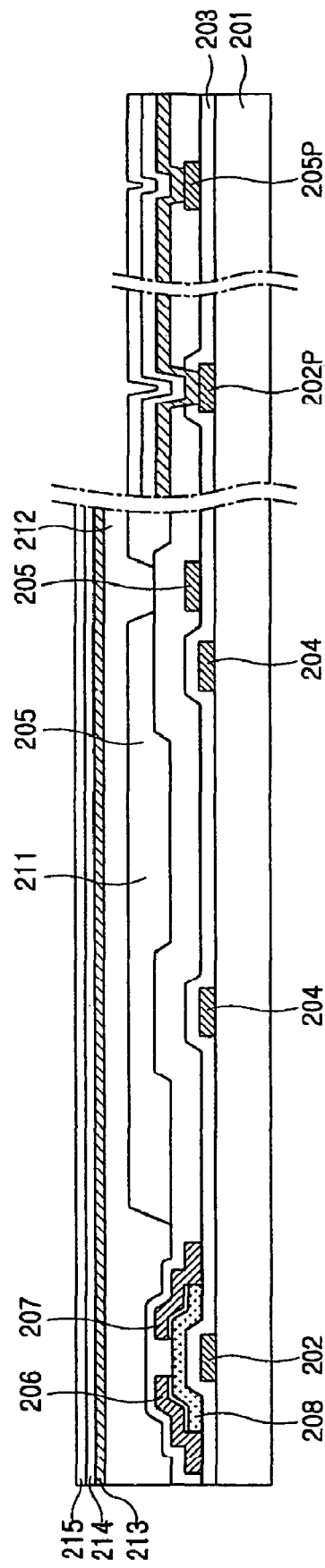

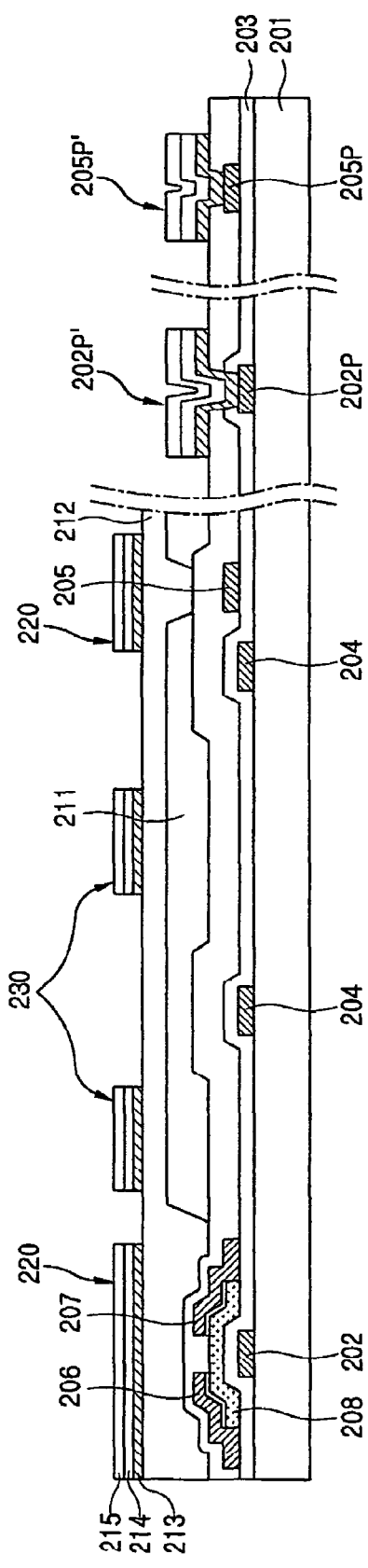
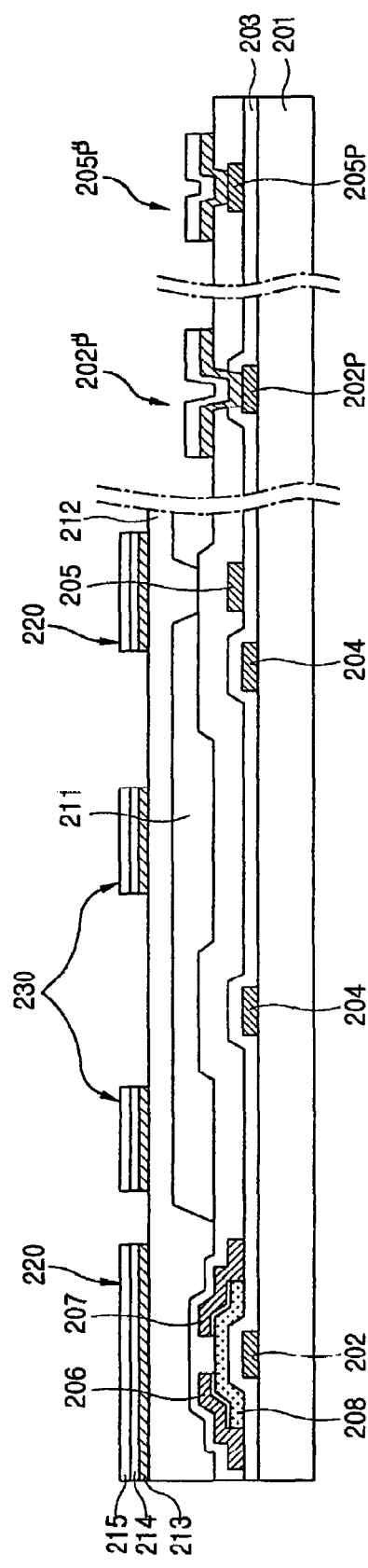

LIQUID CRYSTAL DISPLAY DEVICE HAVING STRUCTURE OF COLOR FILTER ON TFT AND USING IN PLANE SWITCHING MODE

The present application claims the benefit of the Korean Application No. 2004-39344 filed in Korea on May 31, 2004, which is hereby incorporated by reference.

BACKGROUND OF THE INVENTION

1. Field of the Invention

The present invention relates to a liquid crystal device, and more particularly to a liquid crystal display device having a color filter.

2. Description of the Related Art

With the development of various portable electronic devices such as mobile phones, PDAs, notebook computers, or the like, the demand for light, thin, and small Flat Panel Display (FPD) devices is increasing. Research is active in the area of flat panel display devices, such as an LCD (liquid crystal display), a PDP (Plasma Display Panel), an FED (Field Emission Display), a VFD (Vacuum Fluorescent Display), or the like. Currently, interest is in liquid crystal display (LCD) devices amenable to simple mass-production, using a simple driving system, and providing high picture quality.

The LCD devices have various display modes according to the arrangements of liquid crystal molecules. However, among the various display modes, Twisted Nematic (TN) mode liquid crystal display device has widely been used because of its high contrast ratio, rapid response, and low driving voltage. The TN mode liquid crystal display device includes an array substrate on which pixel regions are arranged, a color filter substrate facing the array substrate, and liquid crystals formed between the array substrate and the color filter substrate. In addition, polarizing plates are formed at outer surfaces of the array substrate and the color filter substrate such that polarized light may reach the liquid crystals. In addition, the liquid crystals are twisted in a spiral shape and arranged between the array substrate and the color filter substrate.

In a related art liquid crystal display device, gate lines and data lines are arranged on the array substrate. Thin film transistors (TFTs) are arranged on the array substrate. Color filter layers for displaying color images are formed on a color filter substrate facing the array substrate. Pixels are arranged on the TFT array substrate and the color filter substrate to form a matrix of pixels that are precisely aligned to each other. If the pixel regions formed on the TFT array substrate and the color filter substrate are imprecisely aligned, a light generated from a backlight may leak. Thus, the alignment of the TFT array substrate and the color filter substrate in the related art liquid crystal device is very important.

To address the misalignment problem, and to focus on a specific substrate for fabricating a liquid crystal display device, a liquid crystal display device having a color filter on TFT (COT) has been provided. In the COT liquid crystal device, the color filter layer is formed on the TFT array substrate. In the liquid crystal display device having the COT structure, since the color filter layers are formed on the TFT array substrate, potentially complicated processes for forming the color filter may be performed when the TFT array substrate is fabricated. The aperture ratio of the display device may be improved by forming the color filter layers on the TFT array substrate. Also, it is easier to arrange the TFT array substrate and an upper substrate when the TFT array substrate includes the color filter layers.

FIG. 1A is a plan view illustrating a pixel region of a related art liquid crystal display device having a COT structure. Referring to FIG. 1, a plurality of gate lines 102a, and a plurality of data lines 107 perpendicularly crossing the gate lines 102a, define pixel regions. In addition, a thin film transistor 130 is formed at one side of the pixel region. The thin film transistor 130 is connected to the gate line 102a and the data line 107.

A black matrix 110 is formed at an upper portion of the gate line 102a and the data line 107. The block matrix 110 blocks unnecessary light from being transmitted from under lower portions of the gate lines and the data lines. In addition, a color filter layer, including a red, green and blue sub-color filter layers (not shown), is formed in the pixel region. The color filter layer provides color display capability for the liquid crystal display device. A pixel electrode 109 is also formed in the pixel region. The pixel electrode 109 applies an electric field to liquid crystals in the pixel region.

Since the color filter layer is formed on the array substrate on which a TFT is formed, a liquid crystal display device having such a structure is referred to as a color filter on array (COA) or a color filter on TFT (COT).

FIG. 1B is a cross-sectional view along line A-A' of the related art liquid crystal display device having the COT structure of FIG. 1A. Referring to FIG. 1B, the gate line (not shown) and a gate electrode 102 diverging from the gate line are formed on a transparent substrate 101, and a gate insulating layer 103 is formed on the gate electrode 102. An active layer 104 of the thin film transistor is formed on the gate insulating layer 103, and source and drain electrodes 106a and 106b are connected to the active layer 104. An ohmic layer 105 is interposed between the source and drain electrodes 106a and 106b. The data line 107 is formed on the gate insulating layer 103. The data line 107 is connected to the source electrode 106a and concurrently formed with the source electrode 106a. A pixel electrode 109 connected to the drain electrode 106b is formed at the pixel region to thereby apply an electric field to a liquid crystal layer 120. The source and drain electrodes 106a and 106b and the data line 107 are insulated by an interlayer passivation layer 108. The black matrix 110 and a color filter layer 111 are separately formed on the passivation layer 108.

A color filer layer, including red, green and blue sub-color filter layers, is formed in each pixel region. The black matrix 110 is formed at a reverse tilt domain region, such as the gate line, the data line and a region where the TFT is formed, thereby preventing light leakage. An upper substrate is located facing the TFT array substrate. The upper substrate includes a transparent substrate 150 and the common electrode 151 formed on the substrate 150. In addition, alignment layers 112 and 152 for aligning the liquid crystals 120 may be further formed on the TFT array substrate. A liquid crystal material 120 is filled between the upper substrate 150 and the TFT array substrate 101.

When fabricating a liquid crystal display device having the COT structure, processes for forming the black matrix 110 and the color filter layer 111 are performed after forming the pixel electrode 109 in each pixel. Since the black matrix 110 and the color filter layer 111 are formed of photosensitive organic layers, photo-mask processes should be performed when forming the black matrix 110 and the color filter layer 111, respectively. The photo-mask processes increase the fabrication time of a liquid crystal display device. Moreover, a photo-mask is so expensive that fabrication costs of liquid crystal displays increase significantly.

The related art, a color filter layer is commonly formed by a pigment dispersing method in which red, green and blue sub-color filters are formed by respective photo-mask processes. The color filter layer is formed by using the pigment dispersing method. The black matrix is separately formed. Accordingly, a total of four photo-mask processes are required. There is a strong felt need in the art to reduce the number of masks.

SUMMARY OF THE INVENTION

Accordingly, the present invention is directed to a liquid crystal display device having structure of color filter on TFT and using in-plane switching mode that substantially obviates one or more of the problems due to limitations and disadvantages of the related art.

An object of the present invention is to provide a method for fabricating a liquid crystal display device having a structure of color filter on TFT using a reduced number of fabrication processes.

Another object of the present invention is to provide a liquid crystal display device having a wide viewing angle.

Additional features and advantages of the invention will be set forth in the description that follows, and in part will be apparent from the description, or may be learned by practice of the invention. The objectives and other features, aspects and advantages of the present invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes gate lines crossing data lines on a first substrate defining a pixel region; at least one common electrode formed in the pixel region; at least one pixel electrode in the pixel region, the at least one pixel electrode corresponding to the common electrode; a color filter layer formed within the pixel region excluding the gate line and the data line; a black matrix having at least three layers, an inner layer of the at least three layers being an electrode material.

In another aspect, a method of fabricating a liquid crystal display device includes forming gate lines and a gate pad electrode on a first substrate; forming data lines and a data pad electrode on the first substrate; forming an interlayer on the data lines and the data pad electrode; forming a color filter layer on the interlayer; forming a passivation layer on the color filter layer; forming contact holes exposing the gate pad electrode and the data pad electrode; and forming at least three layers on the color filter layer to form a black matrix and a pixel electrode, one of the at least three layers including an electrode material.

In another aspect, a liquid crystal display device includes gate lines crossing data lines on a first substrate defining a pixel region; at least one common electrode formed in the pixel region; at least one pixel electrode in the pixel region, the at least one pixel electrode having at least three layers, and the at least one pixel electrode corresponding to the common electrode; a color filter layer formed within the pixel region excluding the gate line and the data line; a black matrix having a same at least three layers as the at least one pixel electrode, an inner layer of the at least three layers being an electrode material.

It is to be understood that both foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 5A is a cross-sectional view of the formation of exemplary gate electrodes and common electrodes in a process of fabricating an array substrate of a liquid crystal device in accordance with an embodiment of the present invention.

FIG. 5B is a cross-sectional view of the formation of exemplary thin film transistors and data electrodes in the process of fabricating an array substrate of a liquid crystal device in accordance with an embodiment of the present invention.

FIG. 5C is a cross-sectional view of the formation of exemplary layers of an interlayer and a color filter in the process of fabricating an array substrate of a liquid crystal device in accordance with an embodiment of the present invention.

FIG. 5D is a cross-sectional view of the lamination of exemplary layers of metal, ITO layer and CrOx in the process of fabricating an array substrate of a liquid crystal device in accordance with an embodiment of the present invention.

FIG. 5E is a cross-sectional view of the formation of exemplary patterns of black matrix parts and electrodes in the process of fabricating an array substrate of a liquid crystal device in accordance with an embodiment of the present invention.

FIG. 5F is a cross-sectional view of the completion of exemplary gate pads and data pads in the process of fabricating an array substrate of a liquid crystal device in accordance with an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
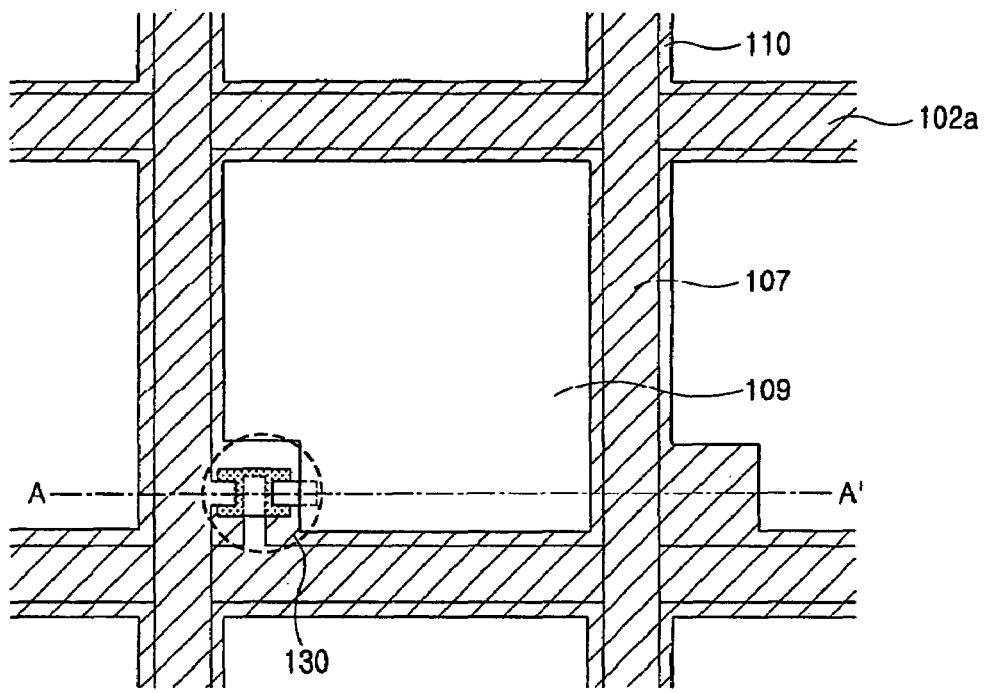
FIG. 1A is a plan view illustrating a pixel region of a related art liquid crystal display device having a COT structure.
Figure 1B:
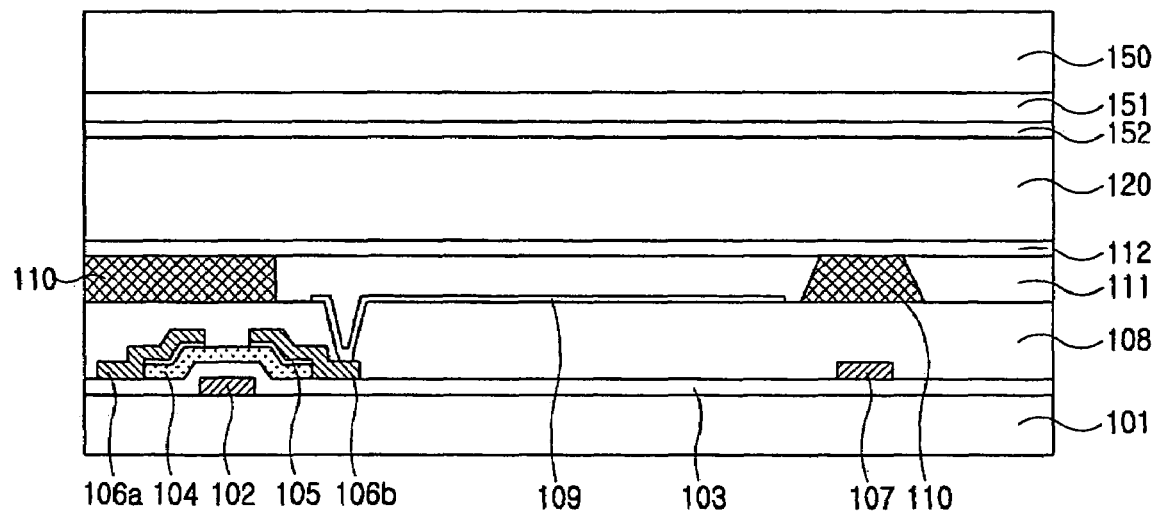
FIG. 1B is a cross-sectional view along line A-A' of the related art liquid crystal display device having a COT structure of FIG. 1A.
Figure 2:
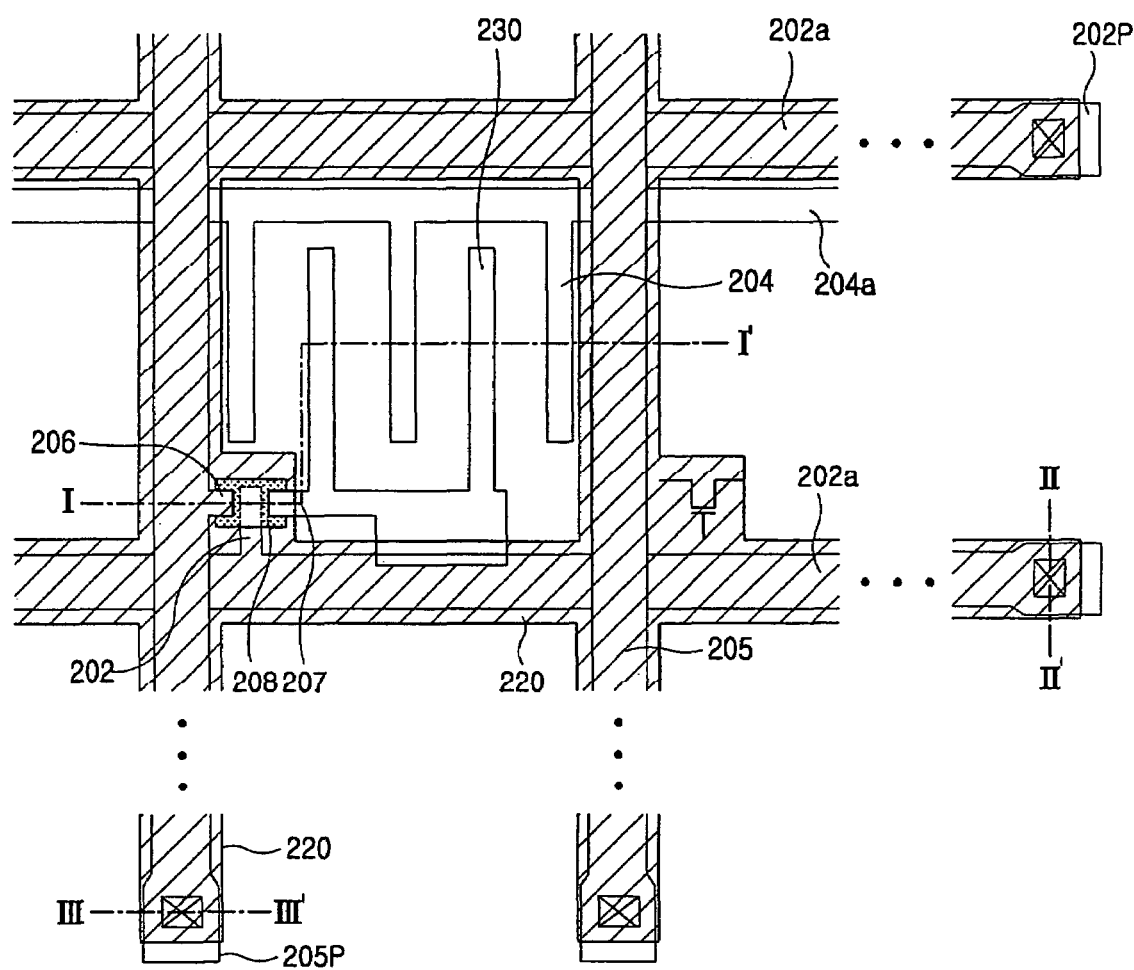
FIG. 2 is a plan view of exemplary pixel regions in an array substrate of a liquid crystal display device having a color filter on thin film transistor structure in accordance with an embodiment of the present invention.

FIG. 2 is a plan view of exemplary pixel regions in an array substrate of a liquid crystal display device having a color filter on thin film transistor (COT) structure in accordance with an embodiment of the present invention. Referring to FIG. 2, a liquid crystal display device includes an array substrate and an upper substrate facing the array substrate. Thin film transistors are arranged in a matrix within the array substrate. Color filter layers also are formed on the array substrate. A plurality of gate lines 202a and a plurality of data lines 205 crossing the gate lines 202a define pixel regions on a transparent substrate, such as glass. Specifically, an M-number of gate lines 202a and an N-number of data lines 205 define an (M×N)-number of pixel regions.

A common line 204a is provided in the pixel region. The common line 204a is parallel to the gate line 202a. At least one common electrode 204 extends from the common line 204a in the pixel region. The at least one common electrode 204 is parallel to the data lines 205. In addition, at least one pixel electrode 230 is provided in the pixel region. The at least one pixel electrode 230 is parallel to the at least one common electrode 204. The common electrode 204 can be made of the same material as the gate line 202a and can be formed on the same layer as the gate line 202a. However, in order to improve an aperture ratio, the common electrode 204 may be formed of indium tin oxide (ITO) on the same layer as the pixel electrode 230. Liquid crystals are driven by an horizontal electric field formed between the at least one common electrode 204 and the at least pixel electrode 230.

In an embodiment of the present invention, an insulating layer (not shown) may be provided between the pixel electrode 230 and the common electrode 204. In addition, a part of the pixel electrode 230 overlaps the gate line 202a with an insulating layer interposed between, thereby forming a capacitor.

Although not shown in FIG. 2, a color filter layer is formed within each pixel region. The color filter layer formed in each pixel region includes one of red, green and blue sub-color filter layers. The color filter layer is formed only within the pixel region. That is, the color filter layer is not formed on the gate line or the data line. Instead, black matrix parts 220 are formed on the gate lines 202a and the data line 205 for blocking undesired light emitted from a lower portion outside the pixel region.

In embodiments of the present invention, the black matrix parts 220 are formed concurrently with the at least one pixel electrode 230 and are formed of an opaque metal thin film to prevent light leakage. The black matrix parts 220 are not formed on the same layer as the color filter layer, but on the same layer as the at least one pixel electrode 230. An opaque and thin metal layer can be used for the black matrix parts 220 in order to block undesired light. For example, a Cr layer may be used as the thin metal layer. However, since the Cr layer is highly reflective to external light, a contrast ratio of the liquid crystal display device may be reduced. Accordingly, a CrOx layer having a low reflectance is formed on the Cr layer within the black matrix 220, thereby preventing the black matrix 220 from reflecting external light.

The black matrix 220 further includes a transparent electrode, such as ITO (Indium Tin Oxide), forming a pixel electrode concurrently made with the black matrix. Specifically, the Cr layer, the CrOx layer, and the transparent electrode layer are laminated in a sequential order, and the three layers are patterned concurrently to form the pixel electrode 230 and the black matrix 220. However, the lamination sequence of the Cr layer, CrOx layer and the ITO layer may in general be one of: (a) Cr layer-CrOx layer-ITO layer; (b) Cr layer-ITO layer-CrOx layer; (c) ITO layer-Cr layer-CrOx layer; (d) ITO layer-CrOx layer-Cr layer; (e) CrOx layer-Cr layer-ITO layer; and (f) CrOx layer-ITO layer-Cr layer. Since the CrOx layer prevents reflection of the Cr layer, a lamination sequence in which the CrOx layer is formed under the Cr layer, cannot be used. Thus, in embodiments of the present invention, lamination sequences (d) ITO layer-CrOx layer-Cr layer, (e) CrOx layer-Cr layer-ITO layer, and (f) CrOx layer-ITO layer-Cr layer are not used.

Since the CrOx layer has a weak electric conductivity, the lamination sequence (a), which is Cr layer-CrOx layer-ITO layer, cannot be used to form a gate pad or a data pad, where the lamination is made from the Cr layer. Also, the lamination sequence (c), which is ITO layer-Cr layer-CrOx layer, may cause an etchant of the Cr layer to penetrate the porous ITO layer and etch the gate pad or the data pad formed under the ITO layer. Thus, among the lamination sequences listed above, the lamination order (b), which is Cr layer-ITO layer-CrOx layer, is used in embodiments of the present invention. The black matrix 220 resulting from such a lamination sequence prevents light leakage. Moreover, the black matrix 220 and the pixel electrode 230 are concurrently formed. Thus, in embodiments of the present invention, the number of processes can be reduced.

As shown in FIG. 2, a gate pad electrode 202P is formed at an end of the gate line 202a and a data pad electrode 205P is formed at an end of the data line 205 to thereby supply externally provided signals to the gate lines 205a and the data lines 205. In an embodiment of the present invention, the more conductive ITO layer is the uppermost layer of the gate and data pad. However, in accordance with the lamination sequence (b), which is Cr layer-ITO layer-CrOx layer, the CrOx layer covers the ITO layer. Thus, portion of the CrOx layer overlapping the gate pad and data pad is removed as described below.

Figure 3A:
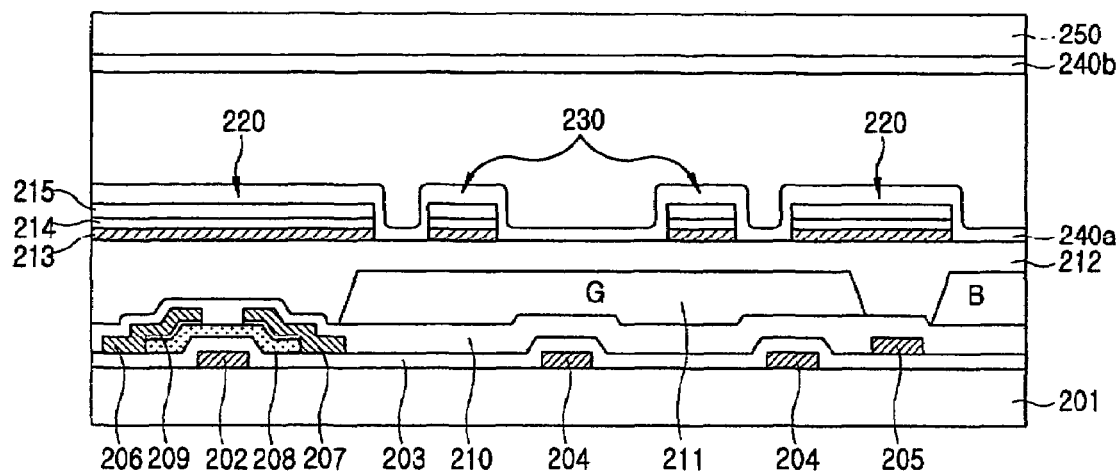
FIG. 3A is a cross-sectional view of an exemplary pixel region along line I-I' in the array substrate of the liquid crystal display device of FIG. 2.

FIG. 3A is a cross-sectional view of an exemplary pixel region along line I-I' in the array substrate of the liquid crystal display device of FIG. 2. Referring to FIG. 3A, a gate electrode 202 and a plurality of common electrodes 204 are formed on a substrate 201. The gate electrode 202 and the common electrodes 204 may be formed of a conductive metal layer, such as aluminum or a dual layer of aluminum and molybdenum. A gate insulating layer 203 is formed on the gate electrode 202 and the common electrodes 204. For example, the gate insulating layer 203 may include a silicon oxide ($SiO_2$) layer. A thin film transistor is formed on a TFT region of the gate insulating layer 203. The thin film transistor includes an active layer 208 formed of a semiconductor layer, and source and drain electrodes 206 and 207 connecting with the active layer 208, respectively. The source and drain electrodes 206 and 207 connect with the active layer 208. An ohmic contact layer 209 is interposed between the source and drain electrodes 206 and 207.

A data line 205 is formed at a predetermined location on the gate insulating layer 203. In addition, a silicon oxide ($SiO_2$) layer or a silicon nitride (SiNx) layer may be formed as an interlayer 211 on the source and drain electrodes 206 and 207 and the data line 205. A color filter layer 211 is formed on the interlayer 210 within each pixel region. The color filter layer 211 is formed only within the pixel region so as not to overlap the gate line 202a (shown in FIG. 2) and the data line 205. The color filter layer 211 includes one of red, green and blue sub-color filter layers. A passivation layer 212 is formed on the color filter layer 211 to protect the components underneath. The passivation layer 212 may be formed of a transparent organic layer.

Black matrix parts 220 and pixel electrodes 230 are concurrently formed on the passivation layer 212. The pixel electrodes 230 are parallel to the common electrodes 204. In one embodiment of the present invention, each of the pixel electrodes 230 is located between adjacent common electrodes 204. Thus, the pixel electrodes 230 and the common electrodes 204 alternate with each other. Thus, the pixel electrodes 230 and the at the common electrodes 204 form a pair of pixel and common electrodes. The black matrix parts 220 form a matrix on the gate lines 202a (shown in FIG. 2), the data lines 205 and the TFT region. The color filter layer is formed in areas surrounded by the black matrix parts 220.

In embodiments of the present invention, an opaque metal layer 213, such as a Cr layer 213 for the black matrix, a transparent layer 214, such as an ITO layer 214 for the pixel electrodes 230, and a low reflectance layer 215, such as a CrOx layer 215 for preventing the Cr layer 213 from reflecting external light, are laminated in a sequential order to form the black matrix 220 and the pixel electrodes 230. An alignment layer 240a for initial alignment of liquid crystals may be further formed on the black matrix 220 and the pixel electrode 230. The black matrix 220 covers the gate pad electrode 202P and the data pad electrode 205P formed at the ends of the gate lines 202a and the data lines 205. An upper substrate 250 facing the array substrate 201 is formed at one side of the array substrate, which includes the thin film transistors. A liquid crystal material is filled between the array substrate 201 and the upper substrate 250.

Figure 3B:
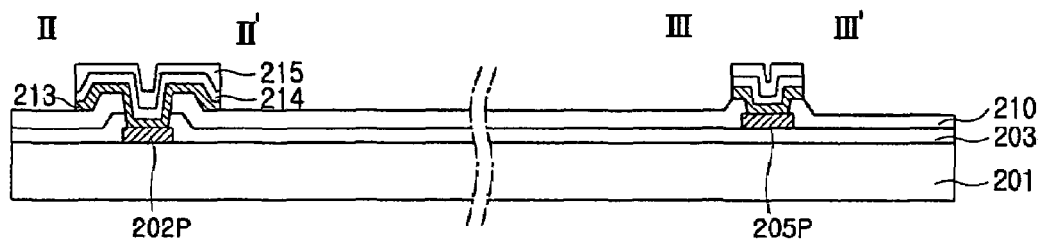
FIG. 3B is a cross-sectional view of an exemplary gate pad and an exemplary data pad along lines II-II' and III-III', respectively, in the array substrate of the liquid crystal display device of FIG. 2.

FIG. 3B is a cross-sectional view of an exemplary gate pad and an exemplary data pad along lines II-II' and III-III', respectively, in the array substrate of the liquid crystal display device of FIG. 2. Referring to FIG. 3B, a gate pad includes a gate pad electrode 202P, which may be at one end of one of the gate lines 202a. Portions of the Cr layer 213, the ITO layer 214 and the CrOx layer 215, which form the pixel electrode 230 and black matrix 220, overlap the gate pad electrode 202P. A data pad includes a data pad electrode 205P formed on the gate insulating layer 203. Portions of the Cr layer 213, the ITO layer 214 and the CrOx layer 215, which form the pixel electrode 230 and black matrix 220, overlap the data pad electrode 205P.

Since the gate pad and the data pad should respectively supply an externally provided scan signal and an externally provided data signal to the gate lines 202a and the data lines 205, and are in contact with a TCP (Tape Carrier Package) for connecting the pads with a driving circuit, the more conductive ITO layer should be exposed as the uppermost layer. Thus, in embodiments of the present invention, the CrOx layer 215 on the ITO layer 214 is removed.

Figure 4A:
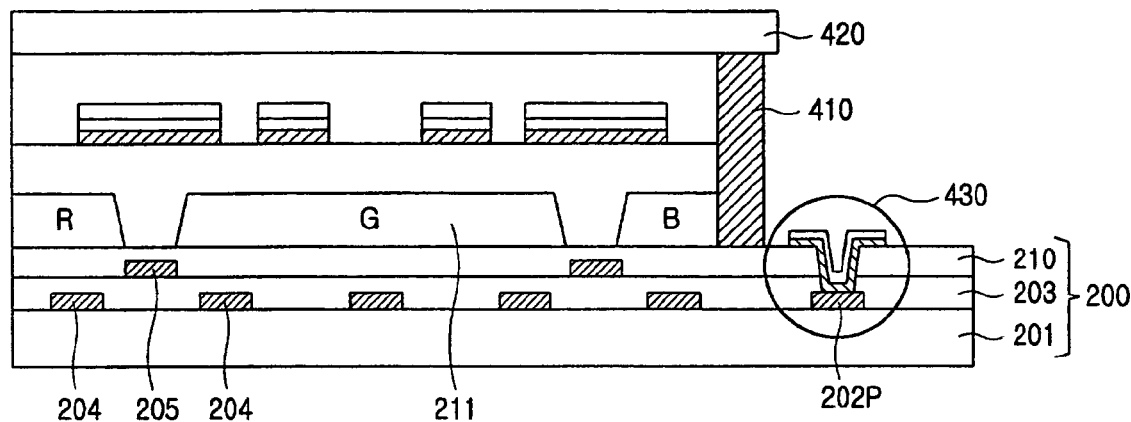
FIG. 4A is a cross-sectional view of an exemplary pad unit outside a pixel region of a liquid crystal display panel in accordance with an embodiment of the present invention.
Figure 4B:
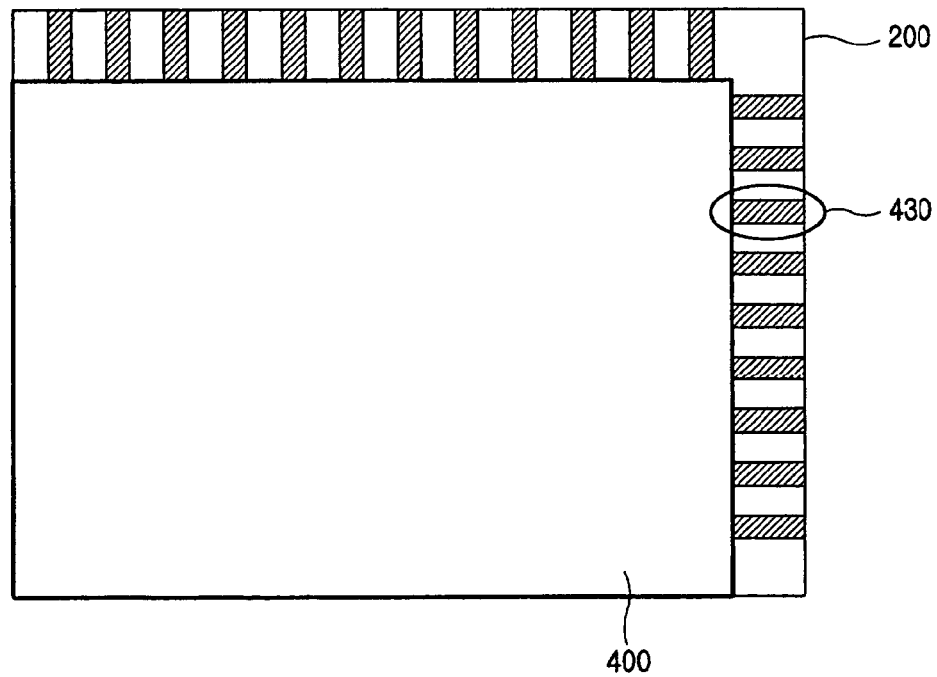
FIG. 4B is a plan view of exemplary pad units outside a liquid crystal display panel in accordance with an embodiment of the present invention.

FIG. 4A is a cross-sectional view of an exemplary pad unit outside a pixel region of a liquid crystal display panel in accordance with an embodiment of the present invention. FIG. 4B is a plan view of exemplary pad units outside a liquid crystal display panel in accordance with an embodiment of the present invention. Referring to FIG. 4a, an array substrate 200 and an upper substrate 420 are attached to each other by a sealant 410, and liquid crystals are filled between the array substrate 200 and the upper substrate 420. Common electrodes 204, data lines 205, and a color filter layer 211 are formed in the array substrate 200. Gate pads and data pads are formed outside the sealant 410 of the array substrate 200. For example, as shown in FIG. 4A a gate pad 430, including a gate pad electrode 202P, is formed outside the sealant 420. As shown in FIG. 4B, the gate pad 430 is located outside the liquid crystal display panel 400.

A weakly conductive CrOx layer is formed on an upper portion of the gate pad electrode 202P and has to be removed to expose a more conductive ITO layer. Specifically, after the array substrate 200 and the upper substrate 420 are attached, the CrOx layer on the gate pad unit 202P is subsequently removed by an ashing process. As a result of the ashing process, a black matrix and a pixel electrode are formed using a metallic material, especially a dual layer of a Cr film and a CrOx film, and an ITO layer laminated together with the dual layer.

Accordingly, in accordance with embodiments of the present invention, a liquid crystal display device having a COT structure is provided. Each of a gate pad and a data pad of the liquid crystal display device includes laminated layers, including a Cr layer and an ITO layer. The ITO layer is exposed. A method of fabricating a liquid crystal display device having a COT structure in which a pixel electrode and a black matrix are concurrently formed will be described with reference to FIGS. 5A to 5F.

FIG. 5A is a cross-sectional view of the formation of exemplary gate electrodes and common electrodes in a process of fabricating an array substrate of a liquid crystal device in accordance with an embodiment of the present invention. Referring to FIG. 5A, gate electrodes 202 and common electrodes 204 are formed on the substrate 201, for example by a photolithography process. Concurrently, a gate pad electrode 202P is also formed at the gate pad portion of the substrate. Subsequently, a gate insulating layer 203 is formed on the gate electrode 202 and the common electrodes 204, for example by plasma enhanced chemical vapor deposition (PECVD). The gate insulating layer 203 may be formed of an silicon oxide layer.

FIG. 5B is a cross-sectional view of the formation of exemplary thin film transistors and data electrodes in the process of fabricating an array substrate of a liquid crystal device in accordance with an embodiment of the present invention. Next, referring to FIG. 5B, a thin film transistor is formed on the gate insulating layer and over the gate electrode 202. The process of forming the thin film transistor includes forming an active layer 208 formed of a semiconductor layer on the gate insulating layer 203 and over the gate electrode 202, and forming source and drain electrodes 206 and 207 contacting the active layer 208.

Concurrently with the source and drain electrodes 206 and 207, data pad electrode 205P and data lines 205 are further formed on the gate insulating layer 203. The source and drain electrodes 206 and 207, the data lines 205 and the data pad electrode 205P may be formed by a photolithography process.

FIG. 5C is a cross-sectional view of the formation of exemplary layers of an interlayer and a color filter in the process of fabricating an array substrate of a liquid crystal device in accordance with an embodiment of the present invention. Referring to FIG. 5C, an interlayer 210 subsequently is formed on the source and drain electrodes 206 and 207. An inorganic insulating layer or an organic insulating layer may be used as the interlayer 210. After the interlayer 210 is formed, a photosensitive color filter layer 211, including red, green, and blue sub-color filter layers, is formed on the interlayer 210. Specifically, a color filter layer 211, including one of red, green, and blue sub-color filter layers, is formed in each pixel region. The color filter layer 211 is not formed on upper portions of the gate line (not shown) and the data lines 205. After applying the photosensitive color filter layer 210 to the interlayer 210, the red, green and blue sub-color filter layers are formed at the respective pixel regions by photomask processes. A passivation layer 212 is further formed on the color filter layer 211.

FIG. 5D is a cross-sectional view of the lamination of exemplary layers of metal, ITO layer and CrOx in the process of fabricating an array substrate of a liquid crystal device in accordance with an embodiment of the present invention. Referring to FIG. 5D, following the formation of the passivation layer on the color filter layer 211, contact holes are formed to expose the gate electrode in the gate pad region, and the data electrode in the data pad region. Then, an opaque metal layer 213, an ITO layer 214 used as a pixel electrode, and a CrOx layer 215 are formed on the passivation layer 212 in a sequential order. The opaque metal layer 213 may be a Cr layer. A triple layer of the opaque metal layer 213, the ITO layer 214 and the CrOx layer 215 is concurrently formed on the gate pad and the data pad.

Referring to FIGS. 5C and 5D, in another embodiment of the present invention, following the formation of the color filter layer 211 on the interlayer 210, contact holes (not shown in FIGS. 5C and 5D) are formed to expose the gate electrode in the gate pad region, and the data electrode in the data pad region. The contact holes may concurrently be formed while forming a contact hole for exposing a drain electrode. Then, the passivation layer 212 is formed on the color filter layer 211 after forming the contact holes on the gate pad and the data pad. Then, an opaque metal layer 213, an ITO layer 214 used as a pixel electrode, and a CrOx layer 215 are formed on the passivation layer 212 in a sequential order. The opaque metal layer 213 may be a Cr layer. A triple layer of the opaque metal layer 213, the ITO layer 214 and the CrOx layer 215 is concurrently formed on the gate pad and the data pad.

FIG. 5E is a cross-sectional view of the formation of exemplary patterns of black matrix parts and electrodes in the process of fabricating an array substrate of a liquid crystal device in accordance with an embodiment of the present invention. As shown in FIG. 5E, the opaque metal layer 213, the ITO layer 214 and the CrOx layer 215 laminated in the sequential order are patterned using a photolithography process. The CrOx layer 215 and the ITO layer 214 may be etched using the same etchant during the photolithography process. But, the opaque metal layer 213 is etched using different etchant than for the ITO layer 214. However, if the opaque metal layer 213 may be etched by the same etchant being used for the ITO layer, only one etchant may be used for etching the triple layer. The black matrix parts 220, which cover regions where the gate line, the data line and the thin film transistor are to be formed, and the pixel electrodes 230, which supply an horizontal electric field to liquid crystals, are formed by photolithography. Concurrently with the black matrix parts 220 and the pixel electrodes 230, a gate pad pattern 202P' and a data pad pattern 205P', each of which including laminated layers of the opaque metal layer 213, the ITO layer 214, and the CrOx layer 215, are further formed on the gate pad and the data pad.

As a result of these processes, an array substrate having a COT structure using in-plane switching mode is formed, including the color filter layer, the pixel electrodes and the common electrodes formed on the array substrate. Then, the array substrate and an upper substrate, which is formed by a separate process, are attached to each other. While attaching the upper and array substrates, a seal line (not shown) is formed on the array substrate. After the array substrate and the upper substrate are attached to each other by a sealant, the gate pad and the data pad, which are formed outside the sealant are completed. Specifically, within the gate pad region and the data pad region, the conductive ITO layer should be exposed to provide electric contacts.

FIG. 5F is a cross-sectional view of the completion of exemplary gate pads and data pads in the process of fabricating an array substrate of a liquid crystal device in accordance with an embodiment of the present invention. Referring to FIG. 5F, after the array substrate and the upper substrate are attached to each other, since the gate pad unit and the data pad unit are covered with the weakly conducting CrOx layer 215, the CrOx layer 215 is removed from the gate pad and the data pad regions. An ashing process is performed for removing the CrOx layer 215. Subsequently, a liquid crystal material (not shown in FIG. 5F) is filled in a space between the array substrate and the upper substrate by a liquid crystal injection process to complete the liquid crystal display device.

In embodiments of the present invention, when fabricating a liquid crystal display device having a COT structure using an in-plane switching mode, the number of fabrication processes is reduced by concurrently forming a black matrix and a pixel electrode. In particular, the black matrix and the pixel electrode layer are fabricated by using a plurality of laminated layers, in which the opaque metal layer, the ITO layer and the CrOx layer are laminated in a sequential order. Thus, the black matrix and the pixel electrode may concurrently be formed.

It will be apparent to those skilled in the art that various modifications and variations can be made in the liquid crystal display device having structure of color filter on TFT and using in-plane switching mode of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   gate lines crossing data lines on a first substrate defining a pixel region;
   at least one common electrode formed in the pixel region;
   at least one pixel electrode in the pixel region, the at least one pixel electrode corresponding to the common electrode;
   a color filter layer formed within the pixel region excluding the gate line and the data line;
   a black matrix having at least three layers, an inner layer of the at least three layers being an electrode material.

2. The device of claim 1, wherein the pixel electrode and the black matrix have the same laminated layers.

3. The device of claim 1, wherein the at least three layers of the black matrix include a first layer of conductive opaque layer, a second layer of electrode material, and a third layer of reflective shielding layer in a sequential order.

4. The device of claim 3, wherein the first layer is a Cr layer, the second layer is an ITO layer and the third layer is a CrOx layer.

5. The device of claim 1, wherein the at least one common electrode is formed in the same layer as the gate lines.

6. The device of claim 1, further comprising a passivation layer formed on the color filter layer, wherein the black matrix and the at least one pixel electrode are formed on the passivation layer.

7. A liquid crystal display device, comprising:
   gate lines crossing data lines on a first substrate defining a pixel region;
   at least one common electrode formed in the pixel region;
   at least one pixel electrode in the pixel region, the at least one pixel electrode having at least three layers, and the at least one pixel electrode corresponding to the common electrode;
   a color filter layer formed within the pixel region excluding the gate line and the data line;
   a black matrix having a same at least three layers as the at least one pixel electrode, an inner layer of the at least three layers being an electrode material.

8. The device of claim 7, wherein the at least three layers of the at least one pixel electrode include a first layer of conductive opaque layer, a second layer of electrode material, and a third layer of reflective shielding layer in a sequential order.

9. The device of claim 8, wherein the first layer is a Cr layer, the second layer is an ITO layer and the third layer is a CrOx layer.

10. The device of claim 7, wherein the at least one common electrode is formed in the same layer as the gate lines.

11. The device of claim 7, further comprising a passivation layer formed on the color filter layer, wherein the black matrix and the at least one pixel electrode are formed on the passivation layer.

* * * * *